(No Model.) 6 Sheets—Sheet 1.
J. DENNIS, W. S. METCALFE & J. A. SHERMAN.
ENVELOPE MACHINE.

No. 462,210. Patented Oct. 27, 1891.

Witnesses:
Geo W Collier
Philip C Smith

Inventors
Joseph Dennis
William S Metcalfe
John A Sherman (No Model.) 6 Sheets—Sheet 2.

J. DENNIS, W. S. METCALFE & J. A. SHERMAN.
ENVELOPE MACHINE.

No. 462,210. Patented Oct. 27, 1891.

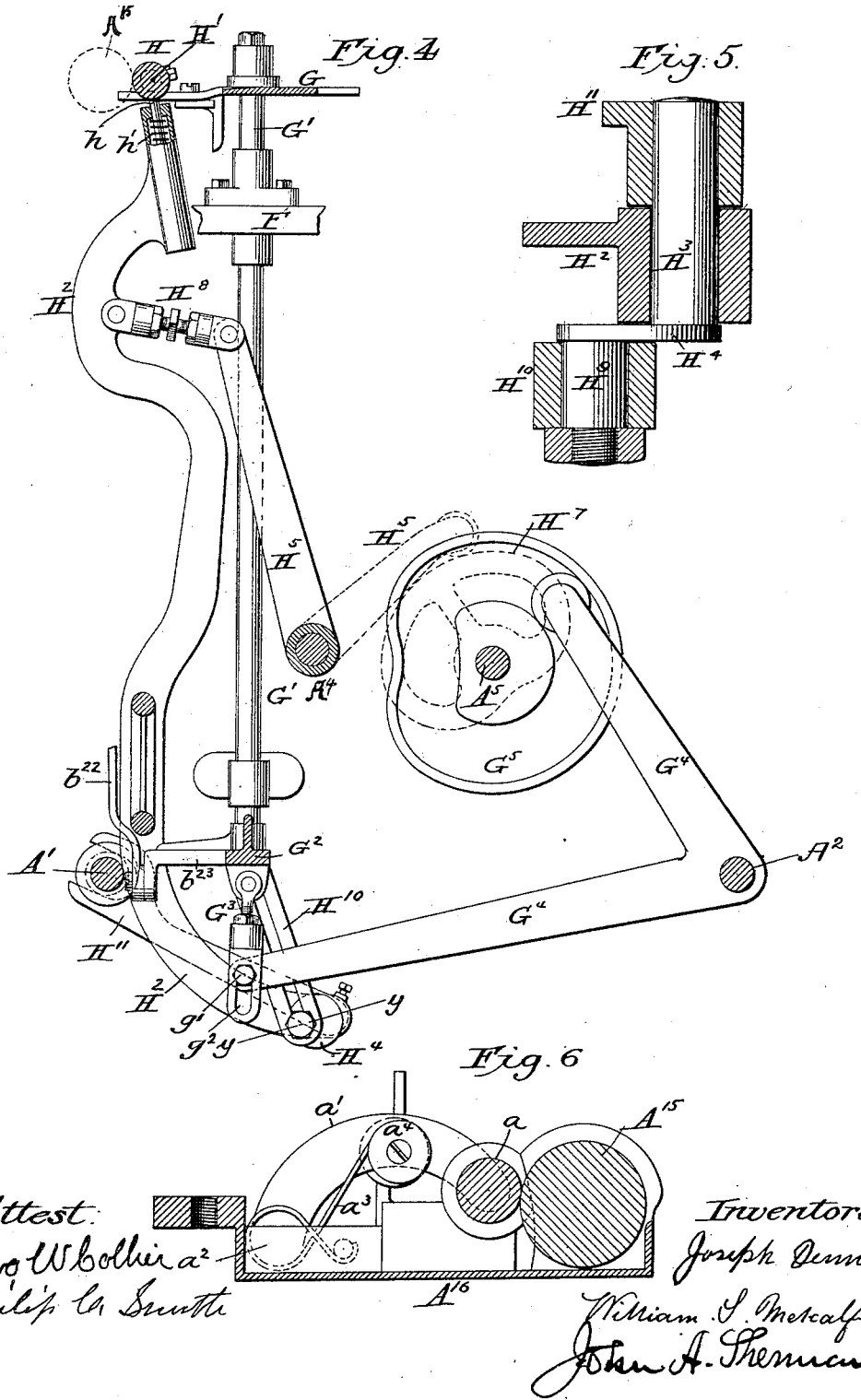

(No Model.) 6 Sheets—Sheet 5.
J. DENNIS, W. S. METCALFE & J. A. SHERMAN.
ENVELOPE MACHINE.
No. 462,210. Patented Oct. 27, 1891.
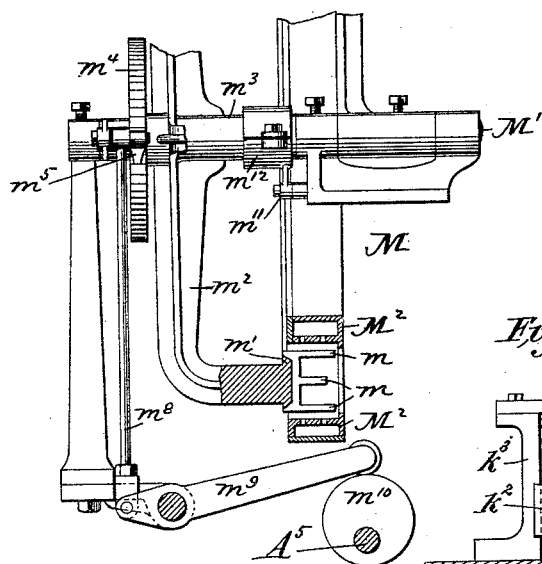
Fig. 7.
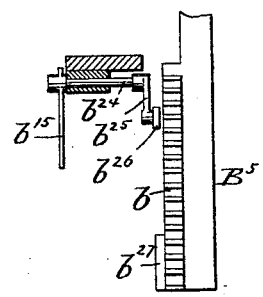
Fig. 10.
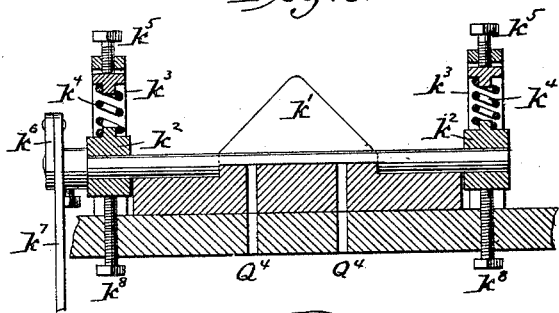
Fig. 8. Fig. 16. Fig. 11.
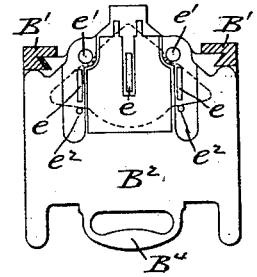
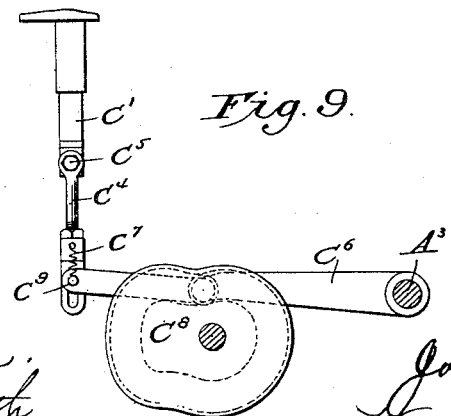
Fig. 9.
Attest.
Geo. W. Collier
Philip C. Smith
Inventors
Joseph Dennis
William S. Metcalfe
John A. Sherman (No Model.) 6 Sheets—Sheet 6.
J. DENNIS, W. S. METCALFE & J. A. SHERMAN.
ENVELOPE MACHINE.
No. 462,210. Patented Oct. 27, 1891.
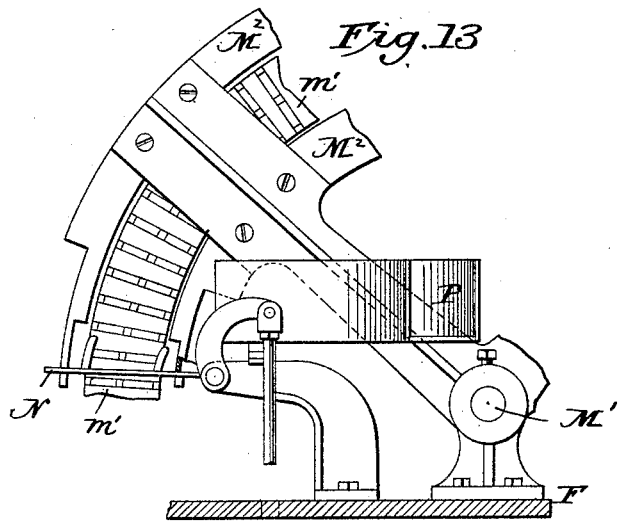
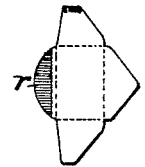
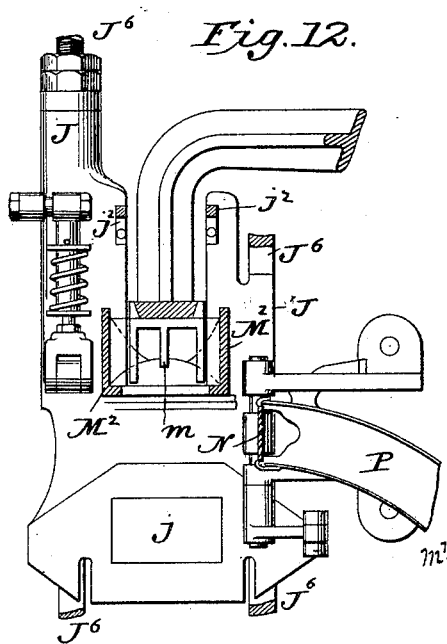
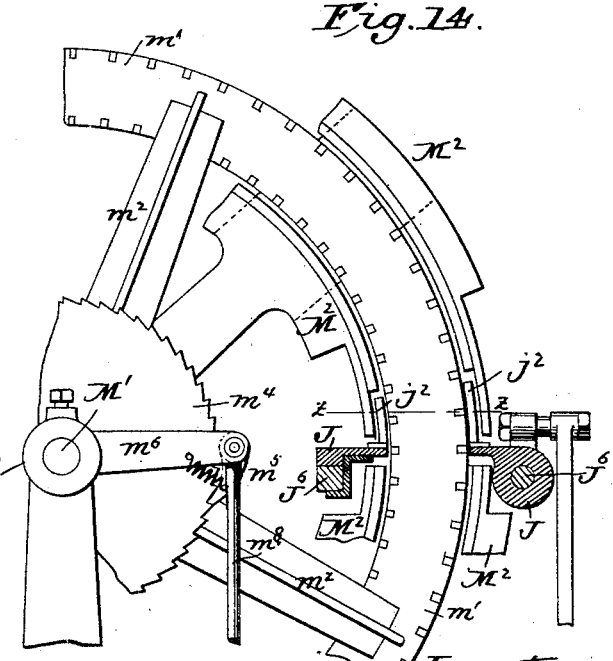
Attest
Geo. W. Collier
Philip C. Smith
Inventors
Joseph Dennis
William S. Metcalfe
John A. Sherman

UNITED STATES PATENT OFFICE.

JOSEPH DENNIS, WILLIAM SHERRAN METCALFE, AND JOHN AMES SHERMAN, OF WORCESTER, MASSACHUSETTS, ASSIGNORS TO THE WHITCOMB ENVELOPE COMPANY, OF SAME PLACE.

ENVELOPE-MACHINE.

SPECIFICATION forming part of Letters Patent No. 462,210, dated October 27, 1891.

Application filed September 29, 1890. Serial No. 366,587. (No model.)

*To all whom it may concern:*

Be it known that we, JOSEPH DENNIS, WILLIAM SHERRAN METCALFE, and JOHN AMES SHERMAN, all of Worcester, county of Worcester, and State of Massachusetts, have invented certain new and useful Improvements in Machines for Making Envelopes, of which the following is a specification.

Our improvement relates especially to mechanisms for operating the gumming-roll and mounting the doctor-roll, and also to mechanisms for mounting the pressure-folder and the drier, and also for other details of mechanism, which are more fully described below.

Figure 1:
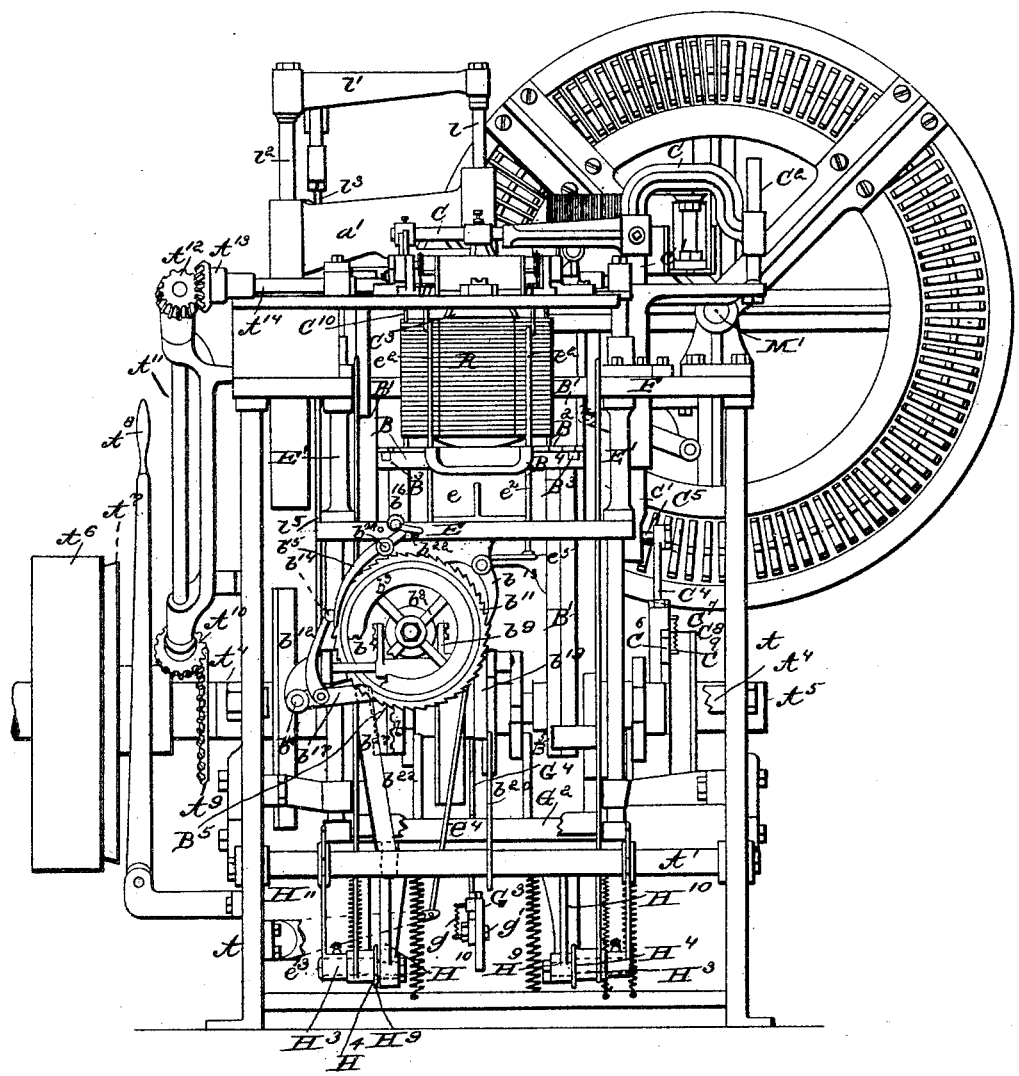
Figure 2:
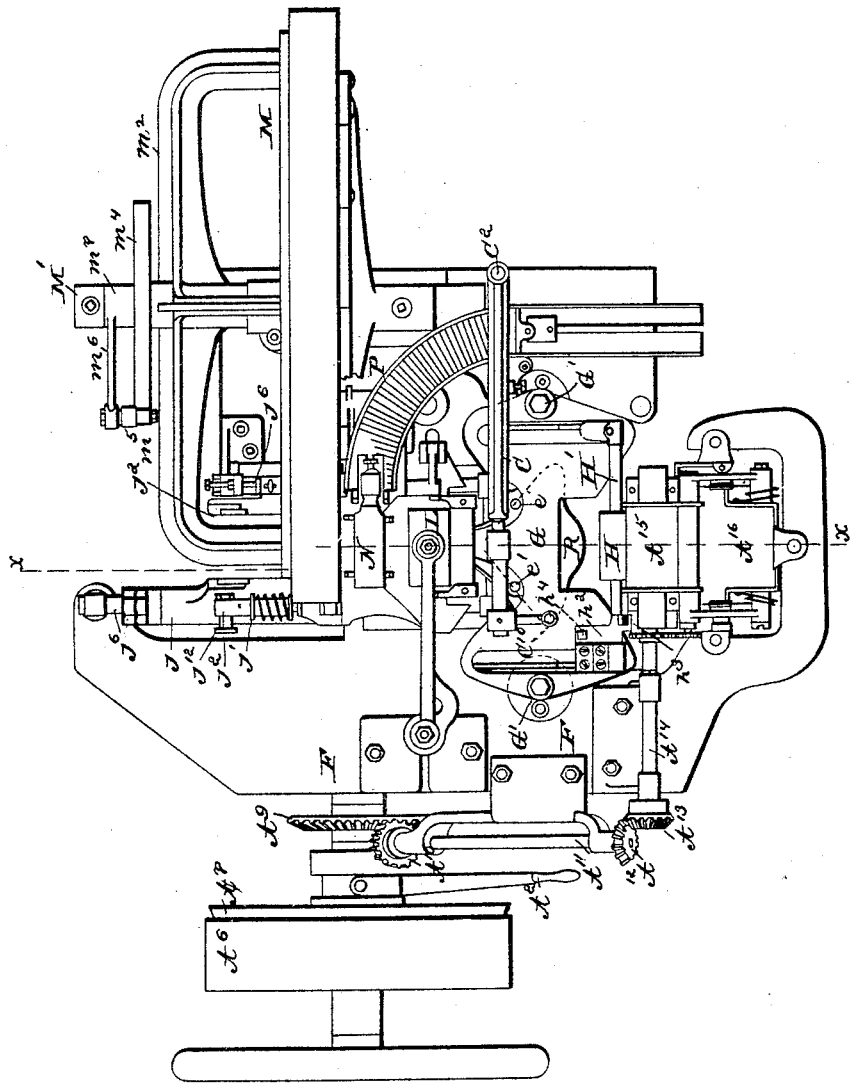
Figure 3:
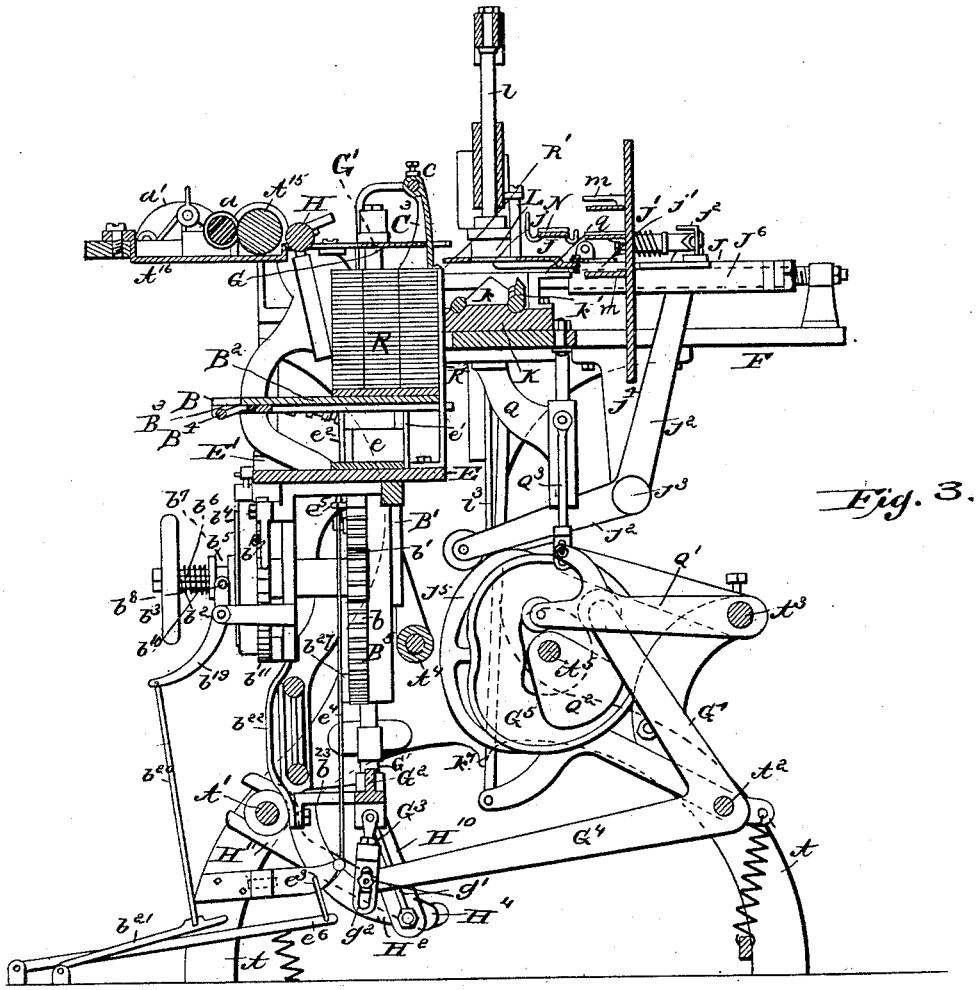

In the drawings, Figure 1 is a front elevation of a machine embodying our invention. Fig. 2 is a plan. Fig. 3 is a cross-section at line $x\ x$ of Fig. 2, portion of the drier being omitted. Fig. 4 is a detail showing the means for operating the gumming mechanism, Fig. 5 being an enlarged section of the stud taken on the line $y\ y$ of Fig. 4. Fig. 6 shows the means of mounting the doctor-roll. Fig. 7 is a detail showing a portion of our drier, partly in section, and means for operating it. Fig. 8 is a section showing the means for mounting the pressure-folder. Fig. 9 shows the picker-operating mechanism, and Fig. 10 the cast-off mechanism for the paper-lifter. Fig. 11 is a plan showing the paper-lifter. Fig. 12 is a horizontal section on the line just above the carrier, as shown in Fig. 3, or on the line $z\ z$ of Fig. 14, and showing a portion of the drier and the lifting-plate in section in a vertical position. Fig. 13 is a detail showing the horizontal position of the lifting-plate, enlarged, with reference to the drier. Fig. 14 is a vertical section taken on a line just to the right of the hooks $j^2$ in Fig. 3 and looking from the back of the machine toward the drier, part of which is also shown; and Fig. 15 shows an envelope-blank which has been gummed on our machine, the gummed portion being indicated by the letter $r$. Fig. 16 shows an elevation of the pressure-folder with its ways.

A is the frame of the machine.

$A'\ A^2\ A^3\ A^4$ are braces which hold the sides of the frame together. Each also serves as the fulcrum for various levers, to be hereinafter described.

$A^5$ is the cam-shaft upon which is mounted various cams for giving motion to the various parts of the machine. A pulley $A^6$ is mounted to rotate freely on the shaft $A^5$, and is connected thereto so as to cause said shaft to rotate by means of the friction-clutch $A^7$, of ordinary construction, thrown into connection by means of the handle $A^8$, in a manner too well understood to require further description. A bevel-gear $A^9$, mounted upon said shaft $A^5$, in connection with a second bevel-gear $A^{10}$, mounted upon a shaft $A^{11}$, and the gears $A^{12}$ and $A^{13}$, impart motion to the shaft $A^{14}$, on which is mounted the large gum-roll $A^{15}$, so as to rotate in the gum-box $A^{16}$.

B is the paper-lifter, on which the envelope-blanks which have been previously cut to the desired shape are placed to be fed to the picker. This lifter B is mounted upon uprights $B^5$, which slide vertically in guides $B'$. The upward movement of the lifter is imparted to it by means of the rack $b$, mounted upon one of the uprights $B^5$ and moved upward by the pinion $b'$, mounted on the shaft $b^2$. This shaft carries a hand-wheel $b^3$ at its outer extremity. It also carries a friction-disk $b^4$, having a hub $b^5$, which slides on a key $b^6$ on the shaft $b^2$, so that the friction-disk $b^4$ is rotated by the shaft, but has a sliding motion in line with the axis of the shaft. This hub $b^5$ has a groove $b^7$ about its periphery, in which sets a pin $b^8$, mounted on the end of a small rocker-arm $b^9$. The position of the hub is controlled by a spring $b^{10}$, which forces the hub and its friction-disk against a suitable surface on the adjacent internal bevel-face of the ratchet-wheel $b^{11}$, this mechanism forming a cup-and-saucer friction-clutch, so that the shaft $b^2$ may be rotated by the ratchet-wheel $b^{11}$ or not, as desired. This ratchet-wheel is moved by a pawl $b^{12}$ and its reverse motion is prevented by a second pawl $b^{13}$. On the pawl $b^{12}$ is mounted a pin $b^{14}$, which bears against a lever $b^{15}$, the position of which is controlled by an eccentric $b^{16}$, operated by a suitable handle, so that by the movement of this eccentric $b^{16}$ and the lever $b^{15}$ the pawl $b^{12}$ may be thrown out from the ratchet-wheel, and so the further operation of the ratchet and parts connected with it be prevented. To accomplish the same operation automatically when the paper-lifter has been lifted as high as is desired, we mount the lever $b^{15}$ upon the end of a rock-shaft $b^{24}$, on the outer end of which is a crank-arm $b^{25}$, having a crank-pin, on which is mounted a friction-roll $b^{26}$. These parts are so located with respect to a stop $b^{27}$, mounted on one of the uprights $B^5$, that the stop will strike the roll $b^{26}$ when the paper-lifter has reached the upper extremity of its movement, thus throwing the lever $b^{15}$ and disengaging the pawl $b^{12}$. The pawl $b^{12}$ is mounted on the lever $b^{17}$, having its fulcrum at $b^{18}$ and being connected with the clamp-operating mechanism, by means of which it is moved up and down by the connecting-rod $b^{22}$.

The mechanism so far described relates to the upward movement of the paper-lifter for the purpose of feeding the blanks. As will be hereinafter described, the stroke of the lever $b^{17}$ is varied in length, according to whether or not it is necessary that blanks shall be fed to the picker. If the downward stroke of the lever $b^{17}$ is sufficiently long, the pawl $b^{12}$ takes in one of the teeth of the ratchet-wheel $b^{11}$, and upon the upward stroke of the lever $b^{17}$ the ratchet-wheel $b^{11}$ is rotated, and with it the shaft $b^2$ and the pinion $b'$, which moves the rack $b$, its upright $B^5$, and the paper-lifter B, mounted thereon, upward.

The clutch mechanism referred to, consisting of the friction-disk $b^4$ and the parts connected to it, is such that when the parts are in their normal position the ratchet-wheel $b^{11}$ causes the friction-wheel $b^4$ to rotate, and thereby moves the various parts in the manner just referred to; but when the friction-disk $b^4$ is withdrawn from the ratchet-wheel $b^{11}$ by depressing the treadle $b^{21}$, which depresses the connecting-rod $b^{20}$ and rocker-arm $b^{19}$, connected with the rock-shaft, on which is the rocker-arm $b^9$, the paper-lifter B will be permitted to drop onto its bed, from which it can be raised either by the use of the hand-wheel $b^3$ or automatically by the operation of the cam $G^5$ and its connecting parts. This mechanism forms the subject of application Serial No. 332,545 now on file in the United States Patent Office.

The picker movement will now be described. C is an arm mounted upon a reciprocating rod C'. One end slides upon a guide-rod $C^2$. Upon this arm C is mounted the picker $C^3$, the lower end of which corresponds in shape with the shape of that portion of the surface of the blank which is to receive the gum. Upon this arm is also mounted a dauber $C^{10}$, made of bristles, rubber, or other yielding material, so located as to strike one of the side flaps of the envelope-blank when the arm C descends. The reciprocating rod C' is connected with a connecting-rod $C^4$ by means of the pin $C^5$. This connecting-rod $C^4$ is slotted at its lower end and is connected by means of a pin $C^9$ with the lever $C^6$, having its fulcrum on the brace $A^3$. By means of a stiff spring $C^7$ the end of the lever $C^6$ is held at the upper end of the slot in the connecting-rod $C^4$. By means of a cam $C^8$ such a motion is imparted to the various parts that the picker will reciprocate in a manner to be described. The picker in its downward stroke strikes the pile of envelope-blanks, and the length of the stroke depends upon the height of the pile of blanks. Consequently as the pile decreases the stroke of the picker becomes longer; but when the pile is fed up again the stroke of the picker becomes shorter. This is rendered possible by the slotted connection between the lever $C^6$ and the connecting-rod $C^4$, which is such that, while the lever $C^6$ has a constant stroke, if the picker does not move through the whole length of the stroke, the spring $C^7$ yields and allows the connecting-pin $C^9$ to move in the slot in the lower end of $C^4$.

In order to supply fresh blanks to the machine, a bracket E is hung by rods E' from the table F. Upon it are mounted three rib-supports $e$.

$e'$ are fixed guides passing up from the bracket to a point just below the path of the carriage. These guides serve as stops against which the forward edges of the envelope-blanks rest.

$e^2$ are movable guides, which, under ordinary circumstances, are in the position shown in Fig. 1, but which may be depressed by means of the treadle $e^6$, lever $e^3$, and connecting-rod $e^4$, connected with the cross-bar $e^5$, upon which these guides are mounted. A spring placed under the treadle $e^6$, as shown, or other suitable means, should be provided for keeping the movable guides in their ordinary position.

The paper-lifter B, which has been above referred to, is provided with a plate $B^2$, upon which the pile of envelope-blanks is placed. This plate $B^2$ slides horizontally in ways $B^3$ in the lifter, and is provided with a handle $B^4$, by means of which the plate may be drawn out toward the operator. It is so shaped that when the paper-lifter B is in its lowest position this plate will lie on each side of the middle rib-support $e$.

Blanks are supplied to the machine in the following manner: The blanks being nearly exhausted, the paper-lifter being near the top of its upward movement, the operator depresses the treadle $e^6$, thereby pulling down the forward guides $e^2$. He then places on top of the rib-supports $e$ a pile of envelope-blanks, which shall fill in the space between the top of the rib-supports $e$ and the under part of the plate $B^2$, and pulling the handle $B^4$ toward him withdraws the plate $B^2$ from under the pile of envelope-blanks already in place, thus allowing them to fall upon the fresh pile of envelope-blanks below them. At the same instant he depresses the treadle $b^{21}$, thus releasing the friction-clutch $b^4$ $b^{11}$ and allowing the paper-lifter B to fall by its own weight to a position below the bottom of the pile of blanks. Then he pushes the plate $B^2$ into place under the envelope-blanks again. Then returning the treadle, the clutch $b^4$ operates the ratchet $b^{11}$, and the machine is ready to feed again, the treadle $e^6$ also being released at the same time to allow the guides $e^2$ to rise and hold the pile of envelope-blanks in place. The wheel $b^3$ is for the purpose of moving the paper-lifter rapidly upward by hand in case it is desired so to do. The paper-lifter therefore has an upward movement given to it by the rack and pinion and its operating mechanism, which will be described later, and a portion of it is horizontally movable for the purpose of enabling the operator to add fresh blanks, when necessary, without stopping the operation of the machine for any material length of time.

The clamp movement will next be described. G is the clamp which holds the pile of blanks in place upon the paper-lifter B, except at the time when it is desired to feed the top blank to the envelope-making mechanism. It is so shaped as to have so much of the blanks exposed as are to be gummed by the picker, dauber, and gumming-roll, and is provided with slots in which the arms $H^2$ move, which carry the gumming-roll H. This clamp G is mounted upon reciprocating uprights $G'$, which pass down below the table F, and are joined by a cross-bar $G^2$, forming a frame which is connected by short connecting-rod $G^3$ to the bent lever $G^4$, having its fulcrum on the brace $A^2$ and operated by a cam $G^5$ on the cam-shaft $A^5$. This cam and lever are for the purpose of giving to the clamp G an upward movement of sufficient duration to allow the picker $C^3$ to raise the blank and the carriage J to move under and receive the blank and to be withdrawn again in the manner to be described, and also by means of this frame to give motion to the pawl $b^{12}$, which is so connected therewith as to be moved positively thereby and impart motion to the paper-lifter when the motion of the frame is sufficient, as below described. The clamp G then descends upon the pile of blanks to hold it so that the top blank will be properly gummed. It will be seen that as each blank is removed by the picker $C^3$ the pile becomes less in height, and consequently the stroke of the clamp becomes longer. To provide for this varying length of stroke of the clamp G there is a slotted connection between the connecting-rod $G^3$ and the lever $G^4$, and a spring $g$ is provided, which shall hold the pin $g'$, connecting the lever $G^4$ and the connecting rod $G^3$, at the upper end of the slot $g^2$, but which shall yield sufficiently to allow the lever $G^4$ to continue the movement given to it by the cam, whatever may be the length of stroke of the clamp G. The length of stroke of this clamp G governs the movement of the pawl $b^{12}$, by which the paper-lifter is raised and the blanks fed to the picker in the following manner: This pawl, being mounted upon the lever $b^{17}$, as above described, is connected with the cross-bar $G^2$ by means of the connecting-rod $b^{22}$, which is fastened to an arm $b^{23}$, projecting from the cross-bar $G^2$, these two parts forming practically part of the reciprocating frame, with which they move. This is a convenient way of mounting the pawl, so that it will move with every motion of the frame and the part G integral therewith, and when the pile of blanks has been sufficiently lowered will make contact with one of the ratchet-teeth and raise the paper-lifter. It will be seen from this that if the downward stroke of the clamp G is very short—say the thickness of one envelope-blank—the movement of the pawl $b^{12}$ caused thereby will not be sufficient to cause it to engage with the next tooth on the ratchet-wheel $b^{11}$, whereas if the movement of the clamp be sufficiently long the pawl will engage with the next tooth, and when the clamp rises the next time it will cause the pawl to push the ratchet-wheel round the distance of one tooth, and consequently feed up the paper-lifter and blanks thereon. By this means the blanks are kept within reach of the picker and yet prevented from being fed so rapidly as to clog the machine. We prefer to use the clamp-frame to actuate the pawl $b^{12}$, as above described; but it is evident that for this purpose it is only necessary that there should be mounted on the frame which carries the pawl a part which shall at its downward movement rest upon the top of the pile of blanks, and it is not necessary that this part shall be in the form of a clamp or shall have any other duty than that of determining whether the pile of blanks has been sufficiently diminished to require them to be fed.

The gumming mechanism will now be described. It consists, in the first place, of the gum-box $A^{16}$ and the gum-roll $A^{15}$, rotated therein, as previously described. $a$ is a doctor-roll mounted upon the end of arms $a'$, hinged at $a^2$ to the outside of the box. $a^3$ is a spring attached at its lower end to the gum-box and also about the hinge $a$, as shown. The upper end of this spring bears upon friction-rolls $a^4$, mounted on the arms $a'$, and the purpose of this spring is to keep the doctor-roll against the gum-roll $a^{15}$ and yet allow the doctor-roll to yield in case the gum is lumpy or in case any waste matter becomes mixed with the gum. In machines in which this doctor-roll is rigid and unyielding any such lumpiness or the introduction of any foreign matter to the gum when it is collected upon the gum-roll $A^{15}$ is apt to cut the surface or spring the bearings of both it and the doctor-roll $a$ and so render the rolls worthless. The gum is conveyed from the roll $A^{15}$ to the envelope blank and picker by means of the roll H on the shaft $H'$, journaled in rods $h$, so mounted in the upper ends of two rocker-arms $H^2$ that the roll can yield in case of necessity, being held to its work by springs $h'$. Each of the arms $H^2$ is mounted on a stud $H^3$, attached to a short crank-arm $H^4$. (See Fig. 5.) By means of the rocker-arms $H^5$, mounted on a sleeve on the brace $A^4$, operated by a cam $H^7$, and connected to the arms $H^2$ by means of the connecting-rods $H^8$, these rocker-arms $H^2$ are given a movement which carries the roll H from the gum-box to the picker and back. Each crank-arm $H^4$ has projecting from it a pin $H^9$, which is journaled in an arm $H^{10}$, which hangs from the cross-bar $G^2$. Upon each stud $H^3$ is also mounted a second crank-arm $H^{11}$, which is forked at its outer end and straddles the brace $A'$. As the cross-bar $G^2$ is reciprocated by means of the lever $G^4$, it carries with it the arm $H^{10}$, which consequently gives to the axis of the arms $H^2$ a reciprocating motion, which motion is modified, however, by reason of the crank-arms $H^{11}$, as will be readily understood. By means of these various parts there is given to the roll H an upward movement during its forward and a downward movement during its backward stroke to enable it to touch the under surface of the picker and at the same time to smear the fly-flap of the envelope-blank, which parts are not in the same arc. Upon the top of one of the arms $H^2$ is mounted a small gum-box $h^2$, having a roll $h^3$ so located that as the gumming-roll H moves to gum the picker $C^3$ the roll $h^3$ will strike the dauber $C^{10}$. This box $h^2$ is preferably nearly covered; but is provided with a hole $h^4$, by means of which it may be filled.

J is the carrier mounted upon ways $J^6$ on the table F. It is connected by a connecting-rod $J'$ with the lever $J^2$, which has its fulcrum on a stud $J^3$, projecting from an arm $J^4$, hung from the bottom of the table F. The lever $J^2$ is operated by a cam $J^5$, mounted on the cam-shaft $A^5$. The carrier is given a forward and backward movement and performs the function first of receiving a blank from the picker and conveying it to the folding-box K, into which it is forced by the plunger L, and later receiving it again from the box K and conveying it to the drier M, and still later withdrawing it from the drier and placing it upon the lifting-plate N, by which it is conveyed to the receiver P, these functions being performed by a simple reciprocating movement. For these purposes the carrier is provided first with an opening $j$, exactly the size of the finished envelope, which is so located that when the carrier is in its forward position the blank, which has been dropped upon it from the picker, lies with the part which is to form the face of the envelope over the opening, and when the carrier is withdrawn that opening is under the plunger L, so that the plunger L will force the blank through the opening $j$ into the box K. There is also provided on the under surface of the carrier a compartment $j'$, so located that when the carrier is at the forward end of its stroke and receiving a blank from the picker this compartment will be directly over the box K to receive the envelope which has been folded and stuck, and when the carrier is at the rear end of its stroke this compartment will lie over one set of fingers $m$ in the drier M, so that the finished envelope will be received from the top of the lift Q and slid over the skids $q$ and onto a set of fingers in the drier, where it is left, these three parts at that instant lying in the same plane.

For the purpose of withdrawing the dried envelope from the drier the carrier is provided with hooks $j^2$, so located that while the carrier is going forward these fingers will withdraw from the drier, the dried envelope pulling it onto the plate N, which for the instant forms a continuation of a set of fingers in the drier, and which is immediately operated to stand the envelope in the receiver P by mechanism well understood.

The folding-box K is of a construction well known in envelope-machines. It is provided with wings $k$ on each side for folding in the side flaps of the envelope-blanks, each of ordinary construction and operated in the usual way. It is also provided with pressure-folder $k'$. This folder is held in bearings $k^2$, which move in slides $k^3$ and are held rigid enough to do the work required by means of the springs $k^4$ and regulating-screws $k^5 k^8$, as shown. These bearings $k^2$, as shown in Fig. 16, bear sufficiently on the ways $k^3$ to require the axis of the pressure-folder $k'$ to be always parallel with the upper surface of the bottom of the folding-box, so that the folder, if it must yield when horizontal because of any imperfection in the envelope in the folder, will remain in a plane substantially parallel with the bottom of said folding-box and not be bent or sprung, as it would be if one end of its axis were lifted while the other remained in its normal position. The springs $k^4$ are not a necessity if the screws $k^5$ are long enough to bear on the bearings $k^2$; but the regulating-screws are an important feature, for by their use we can so adjust the center of the pressure-folder bearing as to be always on the same plane as the upper side of the envelope when folded as it lies in the box, and it will accommodate any thickness of paper usually used in envelope-making, and it will always keep the envelopes of uniform size, which is very essential, and this style of construction is the one we prefer.

The pressure-folder is moved by means of the crank-arm $k^6$ and rod $k^7$, operated by a cam on the shaft A in the usual way.

The drier M consists of a ring $m'$, upon the face of which are mounted fingers $m$, arranged to receive and hold the envelopes to be dried and to enable them to be finally withdrawn when the drying process is over. This ring is mounted upon four arms $m^2$, projecting from a sleeve $m^8$, which is free to rotate upon a stud $M'$, projecting from the frame of the machine. The drier is rotated by a ratchet-wheel $m^4$, mounted upon the same hub, and operated by a pawl $m^5$, attached to the end of an arm $m^6$, projecting from the sleeve $m^7$, mounted on the stud M'. Movement is given to this pawl to rotate the drier by means of the connecting-rod $m^8$, the lever $m^9$, and cam $m^{10}$. Attached to the frame of the machine is also a stud $m^{11}$, to which is attached an adjustable friction-collar $m^{12}$, which passes about the sleeve $m^3$. The purpose of this collar is to prevent the drier from acquiring any momentum when moving under the influence of the pawl $m^5$.

About the fingers of the drier is located the air-box $M^2$, by means of which air may be supplied in the usual way to dry the envelopes if thought best, this box being supplied with suitable holes for the purpose and connected with an air-blast of some kind.

Q is a lift, of ordinary construction, operated by the lever Q' and its cam $Q^2$ and connecting-rod $Q^3$, so that it shall have an up-and-down movement through slots $Q^4$ in the folding-box K, its upward movement being sufficiently high to present the finished envelope in the compartment formed in the bottom of the carrier, as above described, and its downward movement being sufficiently long to prevent it from interfering with the envelope while it is being folded. Two or more skids are provided side by side upon which the finished envelope is slid by the carrier from the top of the lift Q onto the fingers $m$ of the drier. One of these skids is shown at $q$.

The plunger L is mounted upon the end of a sliding rod $l$, hanging from a cross-arm $l'$, which is mounted upon a sliding rod $l^2$. The cross-arm is reciprocated by means of the rod $l^3$, which is given its motion by a cam on the cam-shaft $A^5$. By means of this construction a strong direct pressure is applied to the blank in pushing it through the former $j$ in the carrier J, the plunger being steadied by means of the two slides $l\ l^2$.

The operation of our machine is as follows: The paper-lifter B being stocked with blanks, the picker $C^3$ being raised, and the clamp G resting upon the blanks R and holding them in place, the gum-roll H, having been supplied with gum by the roll $A^{15}$, travels back and gums the lower surface of the picker $C^3$, the roll $h^3$ gumming the dauber $C^{10}$ as it passes. It then travels forward out of the way, and at the forward end of its movement is caused to drop because of the peculiar arrangement of crank-pin $H^3$ and rocker-arm $H^{11}$, which directs its movement so as to gum that part of the blank which is called the "fly-flap," to be used in sealing the envelope by its user. The instant the roll H and box $h^2$ are out of the way the picker-arm C begins to descend until the picker and dauber rest upon the uppermost blank. The lever $C^6$ continues its movement according as it is directed by the cam in case the pile of envelope-blanks R is high. The picker-arm then starts to rise, and the instant before its upward movement begins and as soon as the roll H has gummed the fly-flap of the envelope the clamp G also begins to rise and releases the blanks R under it. The picker lifts the upper blank which is gummed to it and carries it up until it is just below the clamp, it being separated from those below it by a separator R', of ordinary construction, mounted on a rod $R^2$. The carrier J is immediately moved forward by the lever $J^2$ and cam $J^5$, so that it is in position to receive the blank which the picker has raised. The picker then is given a second upward movement sufficiently high to cause the blank to strike the clamp, thus pulling it off the picker, and the blank falls on the carrier with its square portion over the former $j$. The carrier is immediately withdrawn, the clamp G descends, and the gummer travels back to regum the picker and the fly-flap of the next blank. In the meantime the carrier has moved back and the plunger L descends, forcing the blank through the former $j$ and into the folding-box K, which is located below it. The plunger immediately rises and the carrier is then ready for the second forward movement to receive a second blank from the picker in the same manner as before. While the carrier is moving forward the side-flap folders $k$ fold over the side flaps of the blanks and the pressure-folder $k'$ folds over the pressure-flap and sticks it down against the side flaps and so makes the envelope, the fly-flap being turned over by the folder $k^9$ in the ordinary way. When this has been done, the various folders open and the lift Q rises, lifting the finished envelope into the compartment $j'$ in the under part of the carrier J, this operation taking place at the instant when the carrier is forward and has just received upon its upper surface a new blank to be carried to the box. As the carrier starts back with this new blank the envelope which has been finished is slid along the upper surface of the lift and the skids $q$ onto one set of fingers $m$ of the drier, which immediately rotates one tooth so as to carry down the envelope which has just been deposited in it below the path of the carrier. By this movement of the drier a set of fingers containing an envelope which has been carried round by the movement of the drier will be brought into the path of the hooks $j^2$. In the meantime a second envelope has been formed and a third blank has been raised. The carrier now starts forward to receive the third blank and the second envelope, and the hooks $j^2$ on the tail of the carrier passing through the drier, the air-box about which is cut away for the purpose, and withdraws from the set of fingers now on line with the lifting-plate N the dried envelope which the drier has carried completely round and deposits it upon the said lifting-plate, by which it is lifted into the receiver P in a way well known in machines of this class. This operation continues without change until a certain number of blanks represented by a predetermined thickness—say about an eighth of an inch—have been lifted off from the pile R. Up to this time the action of the clamp upon the pawl $b^{12}$ as it moves up and down has been such that the pawl has merely slid over a portion of the tooth on which it lies; but now the stroke of the clamp having become sufficiently long, and it being necessary to feed the pile R upward, the pawl is pulled back onto the next tooth, and when the clamp $f$ rises to release the next blank for the picker it pulls up the pawl and rotates the friction-clutch and its shaft $b^2$, thereby turning the pinion $b'$ and raising the rack $b$ a corresponding amount. This last feature is an important feature of the machine herein described, and its peculiarity consists in the fact that the blanks are fed up from below by an automatic feed, which is dependent for its action upon the thickness of paper which has been removed from the pile of blanks, and consequently on the length of stroke of the clamp, and while it is evident that the time for feeding might be determined by some other part than the clamp—as, for instance, the picker itself or a part constructed especially for the purpose—we have found that the means described is the best now known to us. Its main peculiarity consists in making one element of the stop-motion, of which the pile of blanks is the other element, integral with the reciprocating frame, of which the main part is composed of the parts $G'$ $G^2$, connected directly to the source of motion, and which includes the connections $b^{22}$ $b^{23}$, also integral therewith, by means of which a positive motion of limited length is given to the pawl, the pawl being so connected with the frame that for each motion of the frame there will be a corresponding movement of the pawl. Moreover, by attaching the frame and its moving mechanism it is possible to move it with less friction and wear and with less jar than if the parts are disconnected and strike against each other. There is practically no lost motion in the device herein described, and consequently the parts will move with great rapidity and ease.

The form of drier is new with us. Its construction enables envelopes to be fed into it by a carriage moving in a line parallel with the axis of the drier. Moreover, it can be placed, as shown in the drawings, within sight and reach of the operator, so that if by any chance the machine makes an imperfect envelope such envelope can be easily detected and removed from the drier before it is delivered into the receiver. The shape of its fingers is immaterial so long as it corresponds sufficiently with the shape of the envelope to be dried and the peculiarities of the introducing and withdrawing mechanisms, whatever they may be, and the mode or place of attachment of the fingers is immaterial so long as there is formed between each pair of fingers a pocket which is normally closed on three sides, its fourth side or end—namely, one of those at right angles to the axis of the drier—being open at the proper time to allow the insertion of an envelope.

What we claim as our invention is—

1. In an envelope-machine, a paper-lifter having a vertical movement and carrying a table movable in horizontal ways therein, as set forth.

2. In an envelope-machine, a paper-lifter having a vertical movement and carrying a table movable in horizontal ways, in combination with guides $e^2$, substantially as and for the purposes set forth.

3. In an envelope-machine, the bracket E, provided with supports $e$, in combination with the paper-lifter having a vertical movement capable of dropping below the top of said supports and provided with a table horizontally movable and shaped to lie between said rib-supports, as set forth.

4. In an envelope-machine, a gumming-roll mounted upon one or more radial arms, and mechanism, substantially as described, whereby said arms are oscillated about their axis, said axis being mounted in a frame having a vertical movement, in combination with mechanism whereby said vertical movement is imparted to said frame, all as set forth.

5. In an envelope-machine, a gumming-roll mounted upon one or more horizontally-oscillating radial arms, and mechanism, substantially as described, whereby said arms are oscillated about their axis, said axis being mounted in one or more vertically-oscillating radial arms, in combination with mechanism, substantially as described, whereby said vertical oscillations are given to said last-named radial arms, all as set forth.

6. A gumming-roll mounted upon radial arms $H^2$, the axis of which is a crank-shaft $H^3$, a crank-pin $H^9$, journaled in the vertical moving arm $H^{10}$, and a crank-arm $H^{11}$, connected at its farther end with the stationary axis $A'$, about which as a center said arm $H^{11}$ is capable of oscillating, as set forth.

7. In an envelope-machine, the combination of the picker $C^3$ and dauber $C^{10}$, the gumming-roll H, mounted upon radial arms, mechanism whereby it is given an oscillating movement, and the gumming-roll $h^3$, also mounted upon said radial arms, as set forth.

8. In the folding mechanism of an envelope-machine, an oscillating pressure-folder, in combination with journal-boxes $k^2$, mounted in vertical slides $k^3$ and provided with bearings, substantially as described, said pressure-folder being journaled in said boxes, whereby any vertical motion given to one journal-box will cause a corresponding vertical motion to the other journal-box, all as set forth.

9. In the folding mechanism of an envelope-machine, a folder mounted in bearings held in place between set-screws located opposite each other, whereby the vertical position of said bearings may be adjusted, as set forth.

10. In an envelope-machine, in combination, the pressure-folder $k'$, boxes $k^2$, springs $k^4$, and set-screws $k^3$, as set forth.

11. The drier above described, consisting of a ring mounted upon a shaft in the manner described and having fingers located upon its front or perpendicular face, as set forth.

12. The drier above described, provided with fingers located in radial lines about its axis, each pair of fingers forming a pocket adapted to receive and hold the envelope to be dried during substantially the entire revolution of the drier, the side of said pocket parallel to and farthest from the axis of the drier flaring open wider than any other, one side of said pocket at right angles to the axis of the drier being open to allow insertion of an envelope and the side opposite it being closed, as set forth.

In testimony whereof we have hereunto subscribed our names this 16th day of September, A. D. 1890.

JOSEPH DENNIS.
WILLIAM SHERRAN METCALFE.
JOHN AMES SHERMAN.

Witnesses:
PHILIP COLLINS SMITH,
WILLIAM ALBERT WARDEN.